(12) United States Patent  
Barry et al.

(10) Patent No.: US 8,436,947 B2  
(45) Date of Patent: May 7, 2013

(54) COMBINED TELEPHONE/TV REMOTE CONTROL

(75) Inventors: Keith Barry, San Diego, CA (US);  
Rafael Calderon, San Diego, CA (US);  
Jorge Hernandez, San Diego, CA (US);  
Daniel Jastorff, San Diego, CA (US);  
Rolando Zorrilla, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1100 days.

(21) Appl. No.: 12/120,974

(22) Filed: May 15, 2008

(65) Prior Publication Data

US 2009/0284664 A1    Nov. 19, 2009

(51) Int. Cl.  
*H04N 5/44*    (2011.01)

(52) U.S. Cl.  
USPC .......................... 348/734; 348/552; 348/738

(58) Field of Classification Search .................. 348/734, 348/552, 553, 563–564, 736, 738; 455/3.03, 455/3.06, 41.2, 414.1, 419–420; 725/81, 725/100, 109, 110; *H04N 5/44*  
See application file for complete search history.

(56) References Cited

U.S. PATENT DOCUMENTS

| | | | |
|---|---|---|---|
| 4,349,701 A | 9/1982 | Snopko | |
| 4,356,509 A | 10/1982 | Skerlos et al. | |
| 4,392,022 A | 7/1983 | Carlson | |
| 5,128,987 A * | 7/1992 | McDonough et al. | 379/102.03 |
| 6,850,285 B2 * | 2/2005 | Eaton et al. | 348/563 |
| 6,882,709 B1 | 4/2005 | Sherlock et al. | |
| 7,027,768 B2 | 4/2006 | Hill | |
| 7,330,737 B2 | 2/2008 | Mahini | |
| 2001/0005197 A1 * | 6/2001 | Mishra et al. | 345/100 |
| 2001/0043687 A1 | 11/2001 | Tidwell et al. | |
| 2002/0086703 A1 | 7/2002 | Dimenstein et al. | |
| 2002/0103007 A1 | 8/2002 | Jaggers et al. | |
| 2003/0040334 A1 | 2/2003 | Lee | |
| 2006/0041916 A1 * | 2/2006 | McQuaide | 725/81 |
| 2006/0232578 A1 | 10/2006 | Reinhorn | |
| 2006/0250942 A1 | 11/2006 | Toyama et al. | |
| 2007/0076131 A1 | 4/2007 | Li et al. | |
| 2007/0107019 A1 | 5/2007 | Romano et al. | |
| 2008/0092200 A1 * | 4/2008 | Grady et al. | 725/133 |

(Continued)

FOREIGN PATENT DOCUMENTS

| | | |
|---|---|---|
| KR | 3028104 | 4/2003 |
| WO | 99/66647 | 12/1999 |

OTHER PUBLICATIONS

Peter Shintani, Koichi Oshima, Toshiyuki Suzuki, "TV Acting as Pots Phone Switch", file History of pending U.S. Appl. No. 12/553,349, filed Sep. 3, 2009.

(Continued)

*Primary Examiner* — Trang U Tran  
(74) *Attorney, Agent, or Firm* — John L. Rogitz

(57) ABSTRACT

When a person arrives home with his mobile phone, the phone sends a presence signal via Bluetooth to the TV system in the home, which enables a telephone feature in which phone calls to the phone are relayed to the TV system. The remote control associated with the TV has a microphone and speaker so that a person can use the RC not only to control the TV but also to respond to phone calls, with the TV system relaying voice signals from the RC back to the phone.

5 Claims, 3 Drawing Sheets

U.S. PATENT DOCUMENTS

| | | |
|---|---|---|
| 2008/0152109 A1 | 6/2008 | Bartfeld et al. |
| 2008/0278635 A1* | 11/2008 | Hardacker et al. ............ 348/734 |
| 2009/0109881 A1 | 4/2009 | Li et al. |
| 2009/0125948 A1 | 5/2009 | Kuhlke et al. |
| 2009/0251526 A1 | 10/2009 | Book |
| 2009/0284664 A1 | 11/2009 | Barry et al. |
| 2010/0151904 A1 | 6/2010 | Karaoguz et al. |
| 2010/0194981 A1 | 8/2010 | Hardacker et al. |

OTHER PUBLICATIONS

Zhimei Wu, Jun Wnag, Huanqiang Zhang/ Institute of Software, Chinese Academy of Sciences. "Community network with Intergrated Services", http://www.springlink.com/content/9yqbv3q0lu9lcv9n/fulltext.pd?page=1.

Mobilewhack, "TV Remote Control and Phone", http://www.mobilewhack.com, Oct. 26, 2007.

Crave, "Bluetooth Your Phone to Your TV", http://crave.cnet,co.uk, Feb. 16, 2006.

Alcatel, "Fixed Solutions Division, Alcatel 5000 Communications TV RElease 2.0", Oct. 13, 2006.

* cited by examiner

COMBINED TELEPHONE/TV REMOTE CONTROL

FIELD OF THE INVENTION

The present application relates generally to devices that can be used as both telephones and TV remote controls.

BACKGROUND OF THE INVENTION

TV remote controls are ubiquitous. Typically, viewers watching TV keep their remotes close at hand. The same might not be true of telephones, however. Consider that people arriving home may leave their mobile phones in chargers or on countertops or other locations that might not be nearby the TV, so that they must rise off the couch and seek their phones to respond to incoming calls.

SUMMARY OF THE INVENTION

A TV system includes a TV and a remote control (RC) configured to send wireless command signals such as to change a tuned-to channel displayed on the TV. The RC also includes a microphone into which a person can speak. The TV system is configured to wirelessly receive signals representing telephony signals from a wireless telephone. The microphone of the RC can receive acoustic signals from a person, and the TV system is configured to wirelessly send signals representing the acoustic signals to the wireless telephone.

The telephony signals can represent, e.g., a caller's voice. The TV system may be configured to receive a presence signal from the wireless telephone indicating that the wireless telephone is nearby the TV system and in response enabling use of the RC as a telephone. This presence signal can be sent using Bluetooth.

If desired, the RC can include a speaker on which telephony signals are displayed. In addition or alternatively, the TV's speakers can be used to display a caller's voice. The signals representing telephony signals can be received on Bluetooth and the signals representing the acoustic signals can also be sent on Bluetooth. The TV may act as a relay between the RC and the wireless telephone, In another aspect, a TV remote control (RC) has a handheld housing, a keypad on the housing, and a microphone in the housing. A processor is in the housing may receive signals from the microphone and keypad. A TV remote control signal generator is also in the housing and is controlled by the processor to send signals such as channel control commands to the TV. The RC is also configured to wirelessly transmit signals representing voice signals received at the microphone.

In another aspect, a presence signal is sent via Bluetooth from a mobile phone to a TV system. In response to the presence signal, a telephone feature is enabled in which phone calls to the phone are relayed to the TV system. A user can input voice signals to a remote control (RC) associated with the TV, with the signals being relayed from the RC back to the phone.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
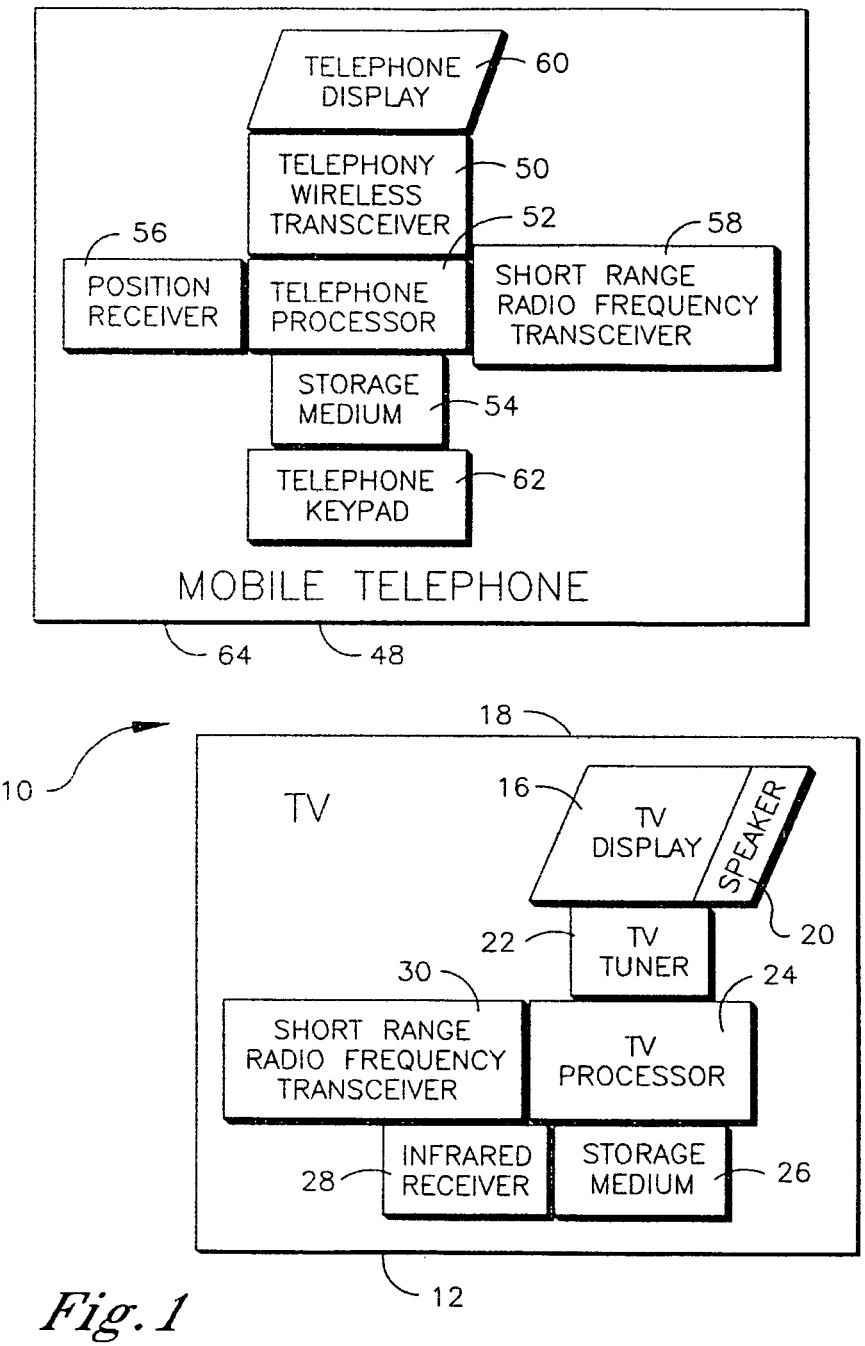
FIG. 1 is a block diagram of an example system in accordance with present principles.
Figure 1:
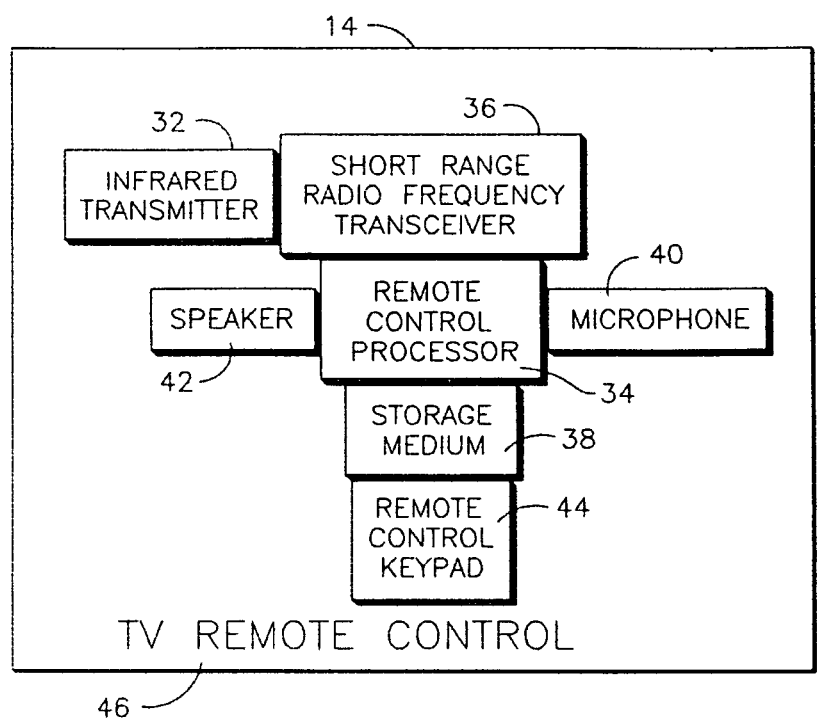

Referring initially to FIG. 1, a system is shown, generally designated 10, which includes a TV system having a TV 12 and remote control (RC) 14, it is to be understood that all of the components of the TV 12 may be included in one chassis or some components, e.g., a tuner, may be included in a set-top box or other ancillary device connected to the TV 12.

As shown, the TV 12 includes a TV display 16 such as a cathode ray tube or flat panel matrix display in standard and/or high definition. The display 16 is mounted on a TV chassis 18, and the chassis 18 also supports one or more audio speakers 20. Programming from a channel tuned to by means of a TV tuner 22 is presented on the display 16 and speakers 20.

The tuner 22 may be controlled by a TV processor 24 accessing data and/or computer instructions stored on a tangible computer readable medium 26 such as solid state storage, disk storage, or other appropriate electronic storage. To receive wireless TV commands such as channel control commands, volume change commands, and the like from the RC 14, the TV 12 typically includes an infrared or other type of TV command receiver 28 sending signals to the TV processor 24. Furthermore, the TV 12 may include a short range radiofrequency (RF) transceiver 30 such as a Bluetooth transceiver that sends signals to the TV processor 24. In the embodiment shown, the TV 12 does not include a transceiver configured to communicate with the public telephony system.

Turning to the RC 14, to send TV commands to the TV 12 the RC typically includes an infrared or other TV command transmitter 32 controlled by a RC processor 34. Furthermore, the RC 14 may include a short range radiofrequency (RF) transceiver 36 such as a Bluetooth transceiver that sends signals to the RC processor 34. The RC processor 34 may access data and/or computer instructions stored on a tangible computer readable medium 38 such as solid state storage, disk storage, or other appropriate electronic storage and may receive voice signal input from a microphone 40 and output voice data on one or more speakers 42. The RC processor 34 may also receive user input from a RC keypad 44. The above-described RC components typically are contained on a portable hand-held housing 46.

FIG. 1 also shows that a wireless telephone 48 may communicate with the TV system described above. With more particularity, the wireless telephone 48, which may be, without limitation, a global systems for mobile communications (GSM) telephone, a code division multiple access (CDMA) telephone, a time division multiple access (TDMA) telephone, a frequency division multiple access (FDMA) telephone, a space division multiple access (SDMA), a wideband-CDMA telephone, an orthogonal frequency division multiplexing (OFDM) telephone, etc. includes a wireless telephony transceiver 50 for communicating with wireless telephony base stations in accordance with principles known in the art.

The telephony transceiver 50 may be controlled by a telephone processor 52 accessing data and/or computer instructions stored on a tangible computer readable medium 54 such as solid state storage, disk storage, or other appropriate electronic storage. In some embodiments the telephone 48 includes a position receiver 56 such as a global positioning satellite (GPS) receiver providing input to the telephone processor 52, as well as a short range radiofrequency (RF) transceiver 58 such as a Bluetooth transceiver communicating with the telephone processor 54. The telephone 48 may also include a telephone display 60 such as a liquid crystal display (LCD) or light emitting diode (LED) display or other type of matrix display that is controlled by the telephone processor 52, as well as a telephone keypad 62 for inputting user commands to the telephone processor 52. The above-described telephone components typically are contained on a portable hand-held housing 64.

Figure 2:
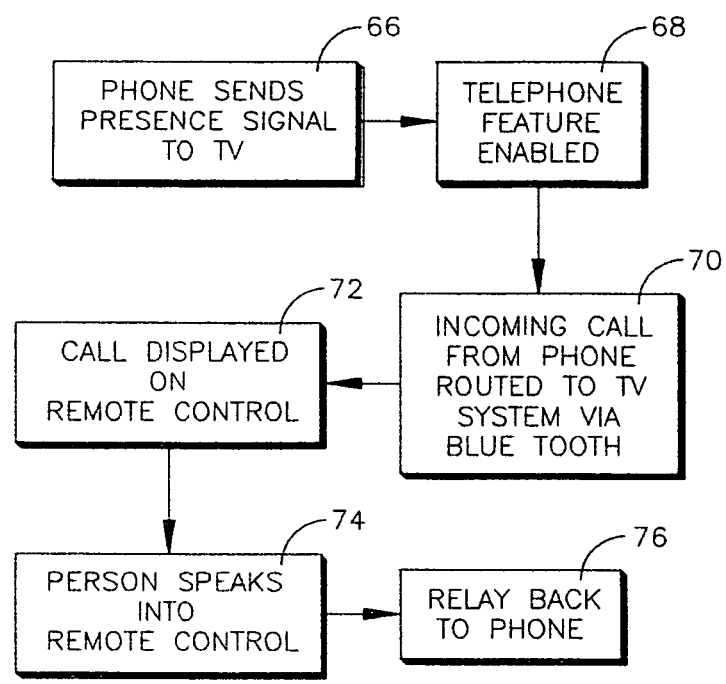
FIG. 2 is a flow chart of example logic that may be used.

With the above example system architecture in mind, attention is now drawn to FIG. 2, which illustrates logic some or all of which may be embodied in the computer-readable media described above. Commencing at block 66, in some implementations the phone 48 can send a presence signal to the TV system when the user, e.g., carries the phone into the house in which the TV system is disposed. This presence signal may be user-generated or it may be in response to signals from the position receiver 56 informing the phone processor 52 that the phone is located in a user-defined geographic location at which the user wishes to use the TV system for telephony purposes as described below. Yet again, the phone 48 may simply broadcast the presence signal periodically, or in response to being connected to a battery charger. In any case, the presence signal may be sent via Bluetooth. Preferably, the TV system acknowledges the presence signal to the telephone.

At block 68, in response to receiving the presence signal, the TV system may enable the telephone feature described below. In other embodiments the feature may always be enabled if unusable due to the absence of the telephone 48. The logic of block 68 may be executed by one or both of the TV processor 24 and RC processor 34.

Moving to block 70, an incoming call to the telephone 48 is sent using, e.g., Bluetooth to the TV system. Recall that the presence signal sent by the telephone 12 preferably is acknowledged by the TV system, so that the telephone processor 52 knows that it is nearby the TV and, thus, that it is to relay calls to the TV system. The step at block 70 may additionally include, in addition to the automatic enabling of telephone-to-TV system communication, a user input as well, allowing the user, by means of a graphical user interface (GUI) presented on, e.g., the TV display 16 or RC that can be automatically displayed upon receipt of the presence signal, to allow the user to select "yes" to enabling telephone operation of the TV system.

The call is then displayed on the RC 14. Specifically, using Bluetooth the telephone 48 can send ring tones and voice signals to the TV 12, which can relay the signals to the RC. The signals may be displayed on the TV speakers 20 and/or on the RC speaker 42.

Further, at block 72 a person holding the RC 14 can speak into the microphone 40, and the RC 14 transmits Bluetooth signals representing the person's voice at block 76. These signals are sent to the telephone 48, which relays them over the telephony network. In this way, a person can conduct a telephone conversation using the RC 14 as a repeater and the telephone 48 as a relay node.

In some embodiments, only the TV 12 need have Bluetooth capabilities; signals, representing both TV command signals and voice signals, may be exchanged between the RC 14 and TV 12 using the infrared link provided by the IR transmitter 32 and IR receiver 28, with the TV 12 relaying voice signals to the telephone 48. In other embodiments, both the TV 12 and RC 14 have Bluetooth capabilities, exchanging voice-related signals on Bluetooth and TV command signals on the IR link with the TV 12 relaying voice signals to the telephone 48. In still other embodiments, the RC 14 may communicate voice signals directly to the telephone 48 using Bluetooth.

While the particular COMBINED TELEPHONE/TV REMOTE CONTROL is herein shown and described in detail, it is to be understood that the subject matter which is encompassed by the present invention is limited only by the claims.

What is claimed is:

1. A TV system, comprising:
   at least one TV; and
   at least one remote control (RC) configured to send wireless command signals at least some of which command signals are to change a tuned-to channel displayed on the TV, the RC also including at least one microphone into which a person can speak;
   the TV system being configured to wirelessly receive signals representing telephony signals from at least one wireless telephone defining a telephone housing, the microphone of the RC configured to receive acoustic signals from a person, the TV system configured to wirelessly send signals representing the acoustic signals to the wireless telephone, wherein the TV system is configured to receive a presence signal from the wireless telephone indicating the wireless telephone is nearby the TV system and in response enabling use of the RC as a telephone, the RC including an RC housing physically distanced and separate from the housing defined by the wireless telephone.

2. The system of claim 1, wherein at least one of the telephony signals represents a caller's voice.

3. The system of claim 2, wherein the RC further comprises at least one speaker on which telephony signals are displayed.

4. The system of claim 1, wherein the signals representing telephony signals are received on Bluetooth and wherein the signals representing the acoustic signals are sent on Bluetooth.

5. The system of claim 1, wherein the TV relays signals between the RC and the wireless telephone.

* * * * *